United States Patent
Baras et al.

(10) Patent No.: US 7,426,503 B2
(45) Date of Patent: Sep. 16, 2008

(54) SYSTEM AND METHOD FOR AN IMPROVED TYPE INFERENCE

(75) Inventors: Adrian S. Baras, Redmond, WA (US); Michael Rys, Sammamish, WA (US); Istvan Cseri, Redmond, WA (US); Oliver N. Seeliger, Sammamish, WA (US); Peter Kukol, Prescott, AZ (US)

(73) Assignee: Microsoft Corporation, Redmond, WA (US)

( * ) Notice: Subject to any disclaimer, the term of this patent is extended or adjusted under 35 U.S.C. 154(b) by 108 days.

(21) Appl. No.: 11/113,708

(22) Filed: Apr. 25, 2005

(65) Prior Publication Data

US 2006/0242115 A1    Oct. 26, 2006

(51) Int. Cl.
    *G06N 5/00*    (2006.01)
(52) U.S. Cl. ............................ 706/52; 706/45
(58) Field of Classification Search ............ 706/45, 706/52; 707/1; 709/201
    See application file for complete search history.

(56) References Cited

U.S. PATENT DOCUMENTS 5,692,184 A * 11/1997 Ardoin et al. ........... 707/103 R
5,737,591 A *  4/1998 Kaplan et al. ............... 707/1
5,867,649 A *  2/1999 Larson ..................... 709/201

OTHER PUBLICATIONS

Draper, D., et al. (Eds.) "XQuery 1.0 and XPath 2.0 Formal Semantics," http://www.w3.org/TR/xquery-semantics, downloaded from the internet on Apr. 20, 2006, pp. 1-266.

* cited by examiner

*Primary Examiner*—Wilbert L Starks, Jr.
(74) *Attorney, Agent, or Firm*—Woodcock Washburn LLP

(57) ABSTRACT

An improved type inference may be calculated for a path expression that may be classified into a series of input expressions followed by steps. For each such series, the inference may be calculated based on input including a type for the input expression, an axis for the step, and a node test for the step. The cardinality of the input expression type is preserved for the calculation of the step type. Also, a set of one or more matching node types may be identified within the type repository. These matching node types are node types within the axis of the step that match the node test of the step. These matching node types are identified without calculating the full content type implied by the axis. Avoiding the calculation of the full content type of the axis may reduce the processing time required to perform the inference.

20 Claims, 14 Drawing Sheets

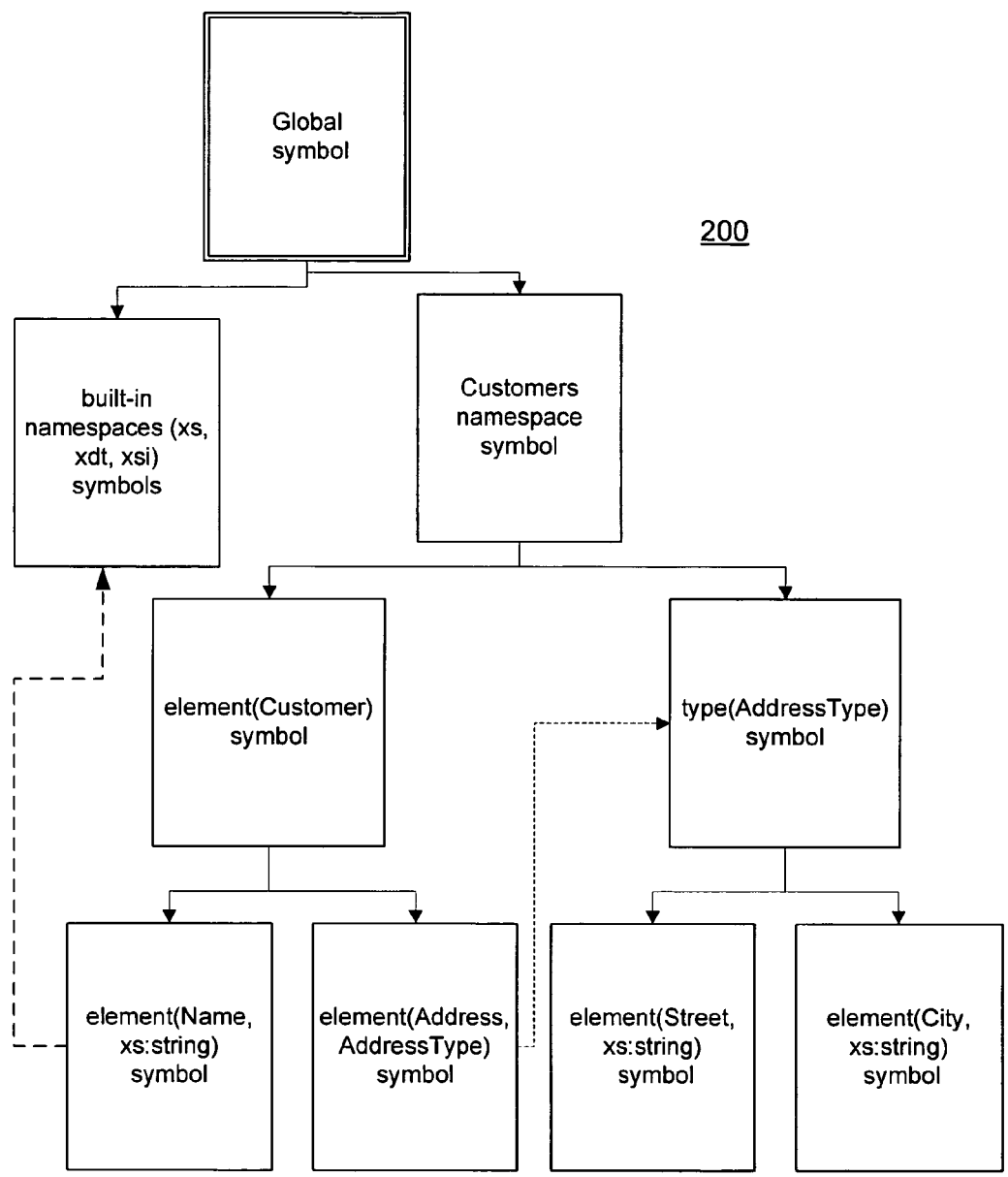

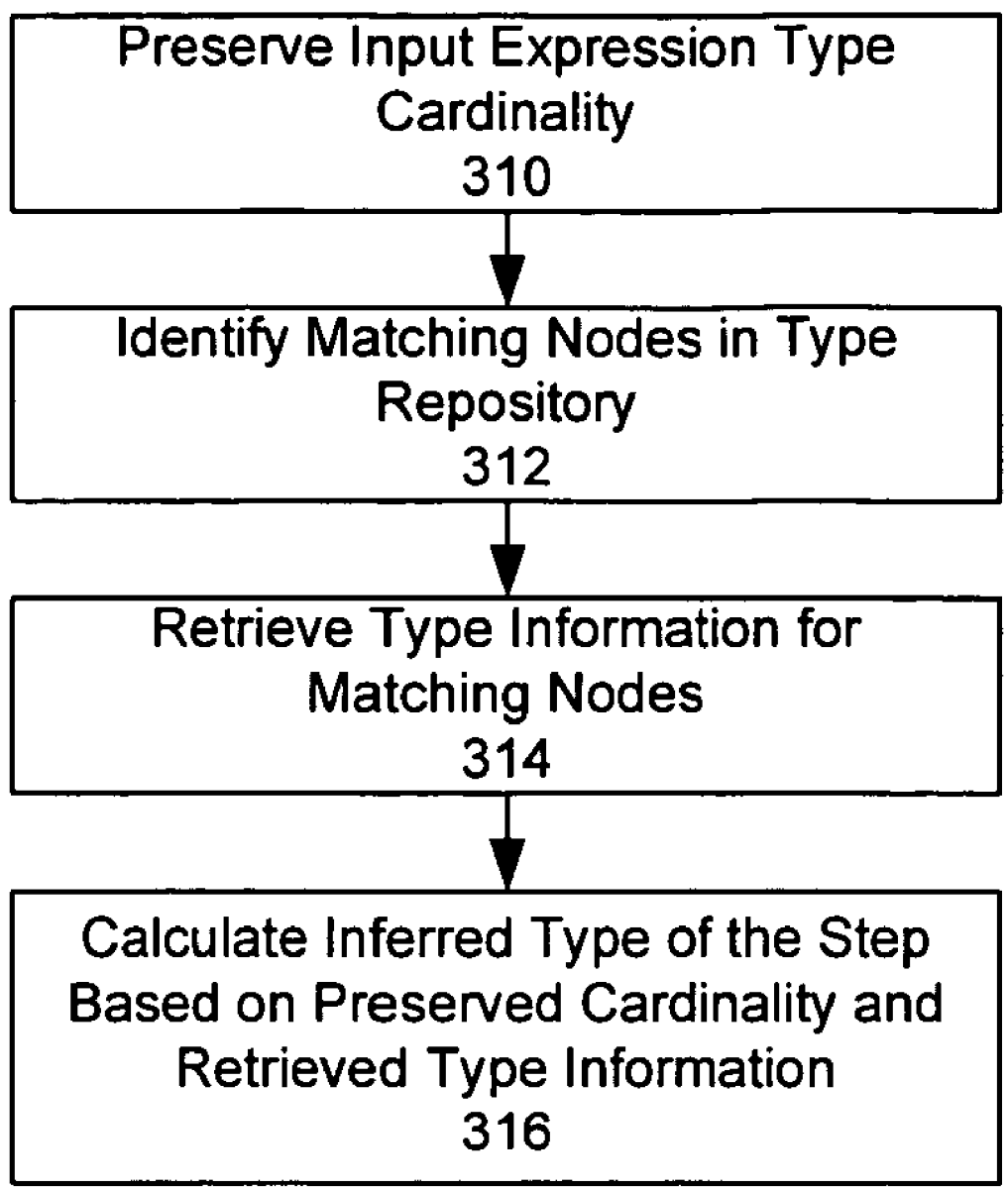

Fig. 4a step-type () for self axis algorithm 401

```
if (T has occurrence)
    then
        T1 = step-type(type-without-occurrence(T), step)
        Occ = get-occurrence(T)
        return combine-occurrrence(T1, Occ)
if (T is interleave type)
    then return interleave of step-type(Ti in T, step)
if (T is sequence type)
    then return sequence of step-type(Ti in T, step)
if (T is union type)
    then return union of step-type(Ti in T, step)
if (T is text)
    then if (get-kind-test(step) is (node, text))
            then return text
            else return empty
if (T is comment)
    then if (get-kind-test(step) is (node, comment))
            then return comment
            else return empty
if (T is processing-instruction)
    then if (get-kind-test(step) is (node, processing-instruction))
            then return processing-instruction
            else return empty
if (T is document)
    then if (get-kind-test(step) is node)
            then return document
            else return empty
if (T is attribute)
    then
        if (get-kind-test(step) is (text, comment,
                                    processing-instruction))
            then return empty
        if (get-kind-test(step) is node)
            then return T
        if (is-name-test(step))
            then return empty
if (T is element)
    then
        if (get-kind-test(step) is (text, comment,
                                    processing-instruction))
            then return empty
        if (get-kind-test(step) is node)
            then return T
        if (match-name(T, get-name(step)))
            then return T
            else return empty
```

Fig. 4b step-type () for descendant, child, attribute axis algorithm part one 402a

```
if (T has occurrence)
    then
        T1 = step-type(type-without-occurrence(T), step)
        Occ = get-occurrence(T)
        return combine-occurrrence(T1, Occ)
if (T is interleave type)
    then return interleave of step-type(Ti in T, step)
if (T is sequence type)
    then return sequence of step-type(Ti in T, step)
if (T is union type)
    then return union of step-type(Ti in T, step)
if (T is text)
    then return empty
if (T is comment)
    then return empty
if (T is processing-instruction)
    then return empty
if (T is document)
    then
        if (get-axis(step) = attribute)
            then return empty
        if (get-axis(step) = child)
            then
                T1 = get-document-content(T)
                return step-type(T1, change-to-self(step))
        if (get-axis(step) = descendant)
            then
                T-doc = get-document-content(T)
                T-child = step-type(T-doc, change-to-self(step))
                T-desc = step-type(T-doc, change-to-
descendant(step))
                R = interleave T-child and T-desc
                return prime-and-occurrence(R)
if (T is attribute wildcard)
    then return get-type-match(T, step)
if (T is attribute)
    then return empty
if (T is element wildcard)
    then return get-type-match(T, step)
```

Fig. 4c step-type () for descendant, child, attribute axis algorithm part two 402b

```
if (T is element)
    then
        if (T has simple content and
            get-axis(step) = (child, descendant))
            then
                if (step is name test)
                    then return empty
                if (get-kind-test(step) = text)
                    then return text?
                if (get-kind-test(step) = comment)
                    then return comment?
                if (get-kind-test(step) = processing-
instruction)
                    then return processing-instruction?
                if (get-kind-test(step) = node)
                    then
                        if (get-axis(step) = child)
                            then return (comment? &
                                         processing-
instruction?)*,
                                         text?
                            else return (comment |
                                         processing-instruction
                                         |
                                         text) *
        Sym-cont = get-content-symbol(T)
        R = step-type-from-symbol(S, step)
        foreach D in types derived from T
            R = union R and step-type(D, step)
        return R
```

Fig. 4d

| step-type () for descendant-or-self axis algorithm 403 |
|---|
| ```
T-desc = step-type(T, change-to-descendant(step))
T-self = step-type(T, change-to-self(step))
R = interleave T-desc and T-self
return prime-and-occurrence(R)
``` |

Fig. 4e

```
                definition of step-type-from-symbol (S, step) 404

Input: S = a content symbol, step = (axis, node-test)
Output: returns result type CM = get-content-model(S)  -- choice, sequence or all
Occ = get-occurrence(S)
R = empty
foreach S-child in S
    if (get-axis(step) = attribute and
        S-child is attribute or attribute wildcard)
        then
            T1 = get-type-match(S-child, step)
            R = interleave R and T1
    if (get-axis(step) = (child, descendant) and
        S-child is element or element wildcard)
        then
            T1 = get-type-match(S-child, step)
            R = add-content(R, CM, T1)
            if (get-axis(step) = descendant)
                then
                    -- Get the type from the symbol
                    T2 = step-type(type-from-symbol(S-child), step)
                    if (T2 is not empty)
                        then R = interleave R and T2
    if (S is not (element or element wildcard or
                  attribute or attribute wildcard))
        then
            Occ-child = get-occurrence(S-child)
            T1 = step-type-from-symbol(S-child, step)
            T1 = step-type(T1, step)
            T1 = combine-occurrrence(T1, Occ-child)
            R = add-content(R, CM, T1)
if (get-axis(step) = descendant)
    then R = prime-and-occurrence(R)  -- cleans out spurious empty
R = combine-occurrrence(R, Occ)
return R
```

Fig. 6

```
for $fs:dot in
    (for $fs:dot in
        (for $fs:dot in fn:root()
            return child:: Customer)
        return child::*)
    return child:: Street
```

(Prior Art)

Fig. 7

701. STATICTYPE[fn:root()] = document {element(Customer,[Anon1]) }
702. STATICTYPE[inner $fs:dot] = document {element(Customer,[Anon1])} [prime factorization]
703. STATICTYPE[inner child::] = element(Customer,[Anon1])
704. STATICTYPE[Customer node test] = element(Customer,[Anon1])
705. STATICTYPE[inner for] = element(Customer,[Anon1])
706. STATICTYPE[middle $fs:dot] = element(Customer,[Anon1]) [prime factorization]
707. STATICTYPE[middle child::] = element(Name, xs:string), element(Address, AddressType)
708. STATICTYPE[*] = element(Name, xs:string), element(Address, AddressType)
709. STATICTYPE[middle for] = element(Name, xs:string), element(Address, AddressType)
710. STATICTYPE[outer $fs:dot] = element(Name, xs:string) | element(Address, AddressType) [prime factorization]
711. STATICTYPE[outer child::] = empty() | (element(Street, xs:string), element(City, AddressType))
712. STATICTYPE[Street] = empty() | element(Street, xs:string)
713. STATICTYPE[outer for] = element(Street, xs:string)* [Add quantifier of prime factorization of step j to result]

(Prior Art)

Fig. 8

801. STATICTYPE[fn:root()] = document {element(Customer,[Anon1])}
802. step-type(document {element(Customer,[Anon1])}, child::Customer ) is calculated as element(Customer,[Anon1])
803. step-type(element(Customer,[Anon1]), child::*) is calculated as element(Name, xs:string), element(Address, AddressType)
804. step-type(element(Name, xs:string), element(Address, AddressType), child::Street) is calculated as element(Street, xs:string)

SYSTEM AND METHOD FOR AN IMPROVED TYPE INFERENCE

FIELD OF THE INVENTION

The present invention relates to the field of query processing and optimization, and, more specifically, to improved techniques for calculating a type inference.

BACKGROUND OF THE INVENTION

Static typing is a feature that may be employed by a query processor during the compilation of a query. Some query languages such as, for example, XQuery 1.0 and XPath 2.0 allow static typing to be performed. The World Wide Web Consortium ("W3C") has provided formal semantics for these languages which describe the static typing for XQuery 1.0 and XPath 2.0 expressions (see http://www.w3.org/TR/xquery-semantics). Static typing enables a number of inferences to be made based on both type schema metadata and on the static semantics of the query itself. Put more simply, static typing may be used to infer an output expression type based on a set of known input expression types. For example, consider the input expression "$X+1," which adds the integer "1" to the variable "X". If it is known that the variable "X" is an integer, then it can be inferred that the type of the output expression is also an integer.

Static typing provides a number of advantages with respect to query execution. In particular, static typing enables early error detection and optimizations in query execution. For example, static typing during query compilation may enable type checks to be avoided at runtime, thereby making the execution process more efficient. While static typing is an optional feature for XQuery 1.0 and XPath 2.0, a static type inference can also be used in implementations that do not perform static typing. The static type inference can be used, for example, for the purpose of query optimization. In the XQuery 1.0 and XPath 2.0 Formal Semantics, the W3C describes a technique for performing the static type inference. The W3C technique involves separating the axis and node test stages of the inference and adding a simplification stage referred to as the "prime type and occurrence" simplification. The node test can in turn be either a node kind test or a name test.

While this W3C technique enables the correct static type to be inferred in many scenarios, its implementation also results in a number of drawbacks. One such drawback is that separating the axis and the node test stages of the inference increases the processing time required to perform the inference. This is because the separation of these stages requires a large quantity of schema information for an entire axis to be calculated during the axis stage and then subsequently filtered down to meet the node test criteria during the node test stage. For example, consider an "Employee" schema with a parent "Employee" node and child nodes "Name," "Age," "Sex," "Eye Color," "Hair Color," and "Height." Now suppose that a type inference is made for the expression "Customer/child::Age," in which the axis is the child axis and the node test is "Age". In this example, the W3C technique requires, during the axis filter stage, retrieving information for every one of the six child nodes on the child axis listed above. Then, during the node test filter stage, the retrieved type information is filtered down to only the node that matches the node test (e.g. the "Age" node). The W3C techniques will also require contracting a temporary type repository which can be quite large and also quite costly.

Another drawback of the W3C technique is that "prime type and occurrence" simplification may cause the static type inference to become less precise. This is because the simplification involves performing a prime factorization upon type information. The prime factorization, while simplifying type information, may also lose structural components of the information. In particular, prime factorization may cause information about a number of occurrences of nodes in a schema to be lost. For example, referring back to the "Employee" schema discussed above, it may be determined that the six child nodes in the "Employee" schema may each occur once in an arbitrary order. However, after a prime factorization is performed, it will still be known that each of the six child nodes is present in the schema, but it will no longer be known how many times each of them occurs. The information that each node occurs only once in the schema will be lost in the simplification. The loss of precision due to the prime type and occurrence simplification is damaging because, for example, it causes fewer expressions to be classified as type safe and it prohibits potentially better optimizations to occur. Accordingly, for these and other reason, there is a need in the art for improved techniques for performing a type inference.

SUMMARY OF THE INVENTION

The present invention is directed to systems and methods for an improved type inference. The inference may be applied in connection with a path expression that includes a number of successive steps. For each step, the inferred type may be calculated based on input that includes a type for the expression on which the step is applied (the input expression), an axis for the step, and a node test. The input expression can be any query language expression such as, for example, an XQuery expression. The term node test, as used herein, refers to a node kind test or a name test. The inference may also be calculated based on a collection of type information for a corresponding schema. This collection of type information may be stored in a type repository such as, for example, a symbol table.

According to an aspect of the invention, the input expression may have an associated type with an associated cardinality. The cardinality may be preserved for calculating the inferred type of the step. The preservation of the input type cardinality may improve the precision of the calculation by, for example, enabling structural information for the corresponding schema to be considered as part of the calculation.

According to another aspect of the invention, a set of one or more matching nodes may be identified within the type repository. These matching nodes are nodes within the axis of the step that match the node test of the step. These matching nodes are identified without calculating the full content type implied by the axis. Avoiding the calculation of the full content type of the axis may reduce the processing time required to perform the inference.

Additional features and advantages of the invention will be made apparent from the following detailed description of illustrative embodiments that proceeds with reference to the accompanying drawings.

BRIEF DESCRIPTION OF THE DRAWINGS

The illustrative embodiments will be better understood after reading the following detailed description with reference to the appended drawings, in which:

FIG. 2 depicts an exemplary symbol table in accordance with the present invention;

FIG. 3 is a flowchart of an exemplary method for calculating a type inference in accordance with the present invention;

FIGS. 4a-e depict exemplary algorithms for calculating a type inference in accordance with the present invention;

FIG. 6 depicts a prior art normalized path expression;

FIG. 7 depicts a prior art type inference calculation;

FIG. 8 depicts a type inference calculation in accordance with the present invention;

DETAILED DESCRIPTION OF ILLUSTRATIVE EMBODIMENTS

The subject matter of the present invention is described with specificity to meet statutory requirements. However, the description itself is not intended to limit the scope of this patent. Rather, the inventors have contemplated that the claimed subject matter might also be embodied in other ways, to include different acts or elements similar to the ones described in this document, in conjunction with other present or future technologies.

Figure 1:
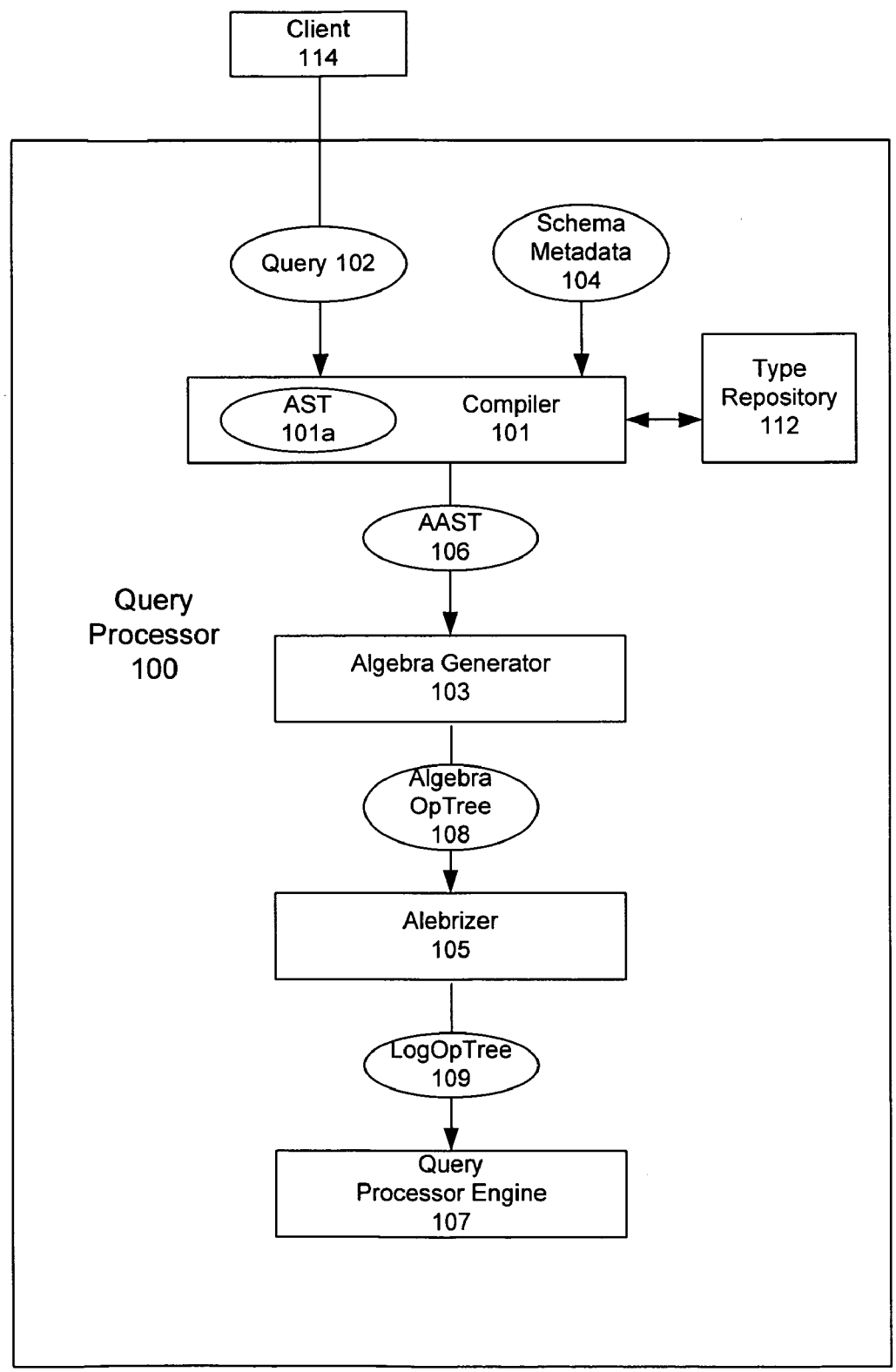
FIG. 1 depicts an exemplary query processor in accordance with the present invention.

An exemplary query processor 100 in accordance with the present invention is shown in FIG. 1. Compiler 101 retrieves schema metadata 104 that describes type information for queryable data. The schema may be defined in a type tree language such as, for example, extensible markup language (XML). Compiler 101 then loads schema metadata 104 into type repository 112. Type repository 112 may be, for example, a symbol table, which is described in detail below with reference to FIG. 2. When an incoming query 102 from client 114 is received at compiler 101, the query 102 is parsed and yields an abstract syntax tree (AST) 101a. The incoming query 102 may be written in a path navigation language such as, for example, XQuery or XPath. The incoming query may be part of a data manipulation language (DML) statement. The compiler 101 performs a pass on the AST 101a and annotates the nodes in the AST 101a with static type information retrieved from the type repository 112. The nodes are annotated based on the statically inferred types of the earlier processed query and the static semantics of the operation. The resulting query tree may be referred to as the annotated abstract syntax tree (AAST) 106.

The present invention provides improved techniques for performing the static type inferences. These techniques may be performed in connection with the generation of the AAST 106. After it is generated, the AAST 106 is then submitted to the algebra generator 103, which generates the algebra Op tree 108. The algebra op tree 108 is then submitted to algebrizer 105, which grafts the algebra Op tree 108 onto a relational Op tree to form a LogOp tree that is executed by the query processor 107.

As described above, compiler 101 loads schema metadata 104 into a type repository 112, which may be, for example, a symbol table. The symbol table may be loaded with symbols for each element, attribute and type declaration in the schema. Before performing static typing, the symbol table may be normalized so that it becomes easier to infer static types. The transformations that are performed during symbol table normalization may include, for example, resolving type names to actual types for element and attribute declarations and resolving referred types to the actual types that are being referred. Also, special attributes may be added to a number of elements within the schema such as, for example, xsi:nil, xsi:type, xsi:schemaLocation, and xsi:noNamespaceSchemaLocation. Furthermore, for each type, a list of all its corresponding derived types may be generated.

An exemplary symbol table 200 in accordance with the present invention is shown in FIG. 2. Symbol table 200 depicts the exemplary schema shown below:

```
<xs:schema xmlns:xs="http://www.w3.org/2001/XMLSchema">
    <xs:element name="Customer">
        <xs:complexType>
            <xs:sequence>
                <xs:element name="Name" type="xs:string"/>
                <xs:element name="Address" type="AddressType"/>
            </xs:sequence>
        </xs:complexType>
    </xs:element>
    <xs:complexType name="AddressType">
        <xs:sequence>
            <xs:element name="Street" type="xs:string"/>
            <xs:element name="City" type="xs:string"/>
        </xs:sequence>
    </xs:complexType>
</xs:schema>
```

Symbol table 200 includes an exemplary "Customer" element type and its structure of having a "Name" element of type xs:string and an element of name "Address" of a global type called AddressType. The symbol table 200 also includes the definition of the AddressType. The content type of elements can be named (as in the case of the Address element) or anonymous (as in the case of the type of the Customer element). Also, the content type can be a combination of union (e.g. choice), sequence, and interleave (e.g. all) types of different cardinalities. These rather complex type repositories can become important information for the preciseness and correctness of the type inference.

The information that is loaded into the symbol table 200 or possibly another type repository 112 is used to perform static type inferences in accordance with the present invention. The static type inferences may be made for a path expression (e.g., /child::Customer/child::Address/child::Street). A path expression may be classified into a succession of step expressions (e.g., child::Customer) divided by the "/" operation. The present invention provides a number of improvements over the W3C techniques for performing the static type inference.

As described above, the W3C techniques normalize an incoming query 102 into a smaller base language. The W3C normalization makes implicit semantics explicit and maps to a smaller sublanguage for which the type inference rules are given. In the case of path expressions, a reference to the document root is added in front of the leading "/" operator. Also, each "/" is normalized into a for-let-where-return (FLWR) expression. As also described above, the W3C techniques involve separating each step expression into its axis filter component (such as, for example, child, descendant, and parent) and a node test. Every axis has a primary node kind associated with it. For the attribute axis, the primary node kind is an attribute node. For all other axes, the primary node kind is an element node. A node test is either a name test or a node kind test. For example, the step Customer is normalized into the axis "child::" and the name test "Customer". Once the normalization is complete, the static type inference is performed following the static type of the FLWR expression, the static type of the axis filter, and the reduction of the type inferred from the axis filter using either the kind test or the combination of the primary node kind and the name test.

In the W3C techniques, since the type repository types of elements are being used to infer the next step's type, any normalization may loose precision. The normalization to FLWR expressions means that every "/" operation may lose more complex type information, since the static type inference of an FLWR expression performs the prime type and occurrence simplification. As discussed above, the prime type and occurrence simplification may cause information about a number of occurrences of nodes in a schema to be lost. For example, the type repository 112 may indicate that element A and element B can occur exactly once but in an arbitrary order (using the XQuery formal semantics notation: A & B). The prime factorization of this type results in a union of A and B, and the cardinality is changed to reflect that each element may occur one or more times using the formal semantics notation: (A|B)+. This looses the structural aspect of the content because an interleave becomes a union and also looses the restriction that A and/or B can each occur only once.

To alleviate the drawbacks of the W3C static inference techniques, the present invention provides improved techniques for performing the static type inference in which the FLWR normalization is avoided and in which the axis and node test operations are performed together rather than separately. The improved techniques of the present invention may be applied in connection with a path expression that includes a number of successive steps. Each series of applying a step to the input expression in the path expression may be classified as an "input" expression followed by a step: (input expression/step). The input expression may be a general expression that does not include an axis and node test. As should be appreciated, every path expression may be classified into a series of this format, and the technique of the present invention may be repeated for each such series. For example, if a path expression includes three steps, then the technique of the present invention may be performed twice—first to move from step one to two—and then again to move from step two to step three, In this scenario, when moving from step one to step two, step one serves as the input expression to step two. Then, when moving from step two to step three, the result of step two serves as the input expression to step three.

A flowchart of an exemplary method for calculating a static type of the step in accordance with the present invention is shown in FIG. 3. The input expression has an associated input expression type with an associated input expression type cardinality. At act 310, the input expression type cardinality is preserved for calculation of the inferred type of the step. Act 310 differs from the W3C techniques, in which the inferred type of the step is calculated based on the cardinality of the prime factorization of the input expression type. At act 312, a set of one or more matching nodes is identified within type repository 112. The matching nodes are nodes that match both the axis and the node test of the step. These matching nodes are identified without calculating the full content type implied by the axis. At act 314, type information for the matching nodes is retrieved from type repository 112. Acts 312-314 differ from the W3C techniques, in which the full content type implied by the axis is calculated and then filtered down based on the node test. Avoiding the calculation of the full content type of the axis may reduce the processing time required to perform the inference.

At act 316, the inferred type of the step is calculated based on preserved cardinality of the input expression and the retrieved type information for the matching nodes. Exemplary algorithms 401-405 for the calculation of stage 316 are depicted in FIGS. 4a-e for a number of different step axes. FIG. 4a depicts an exemplary algorithm 401 for the self axis. FIGS. 4b and 4c depict an exemplary algorithm 402a and 402b for the descendant, child, and attribute axes. FIG. 4d depicts an exemplary algorithm 403 for the descendant-or-self axis 405. In each of the algorithms 401-403, the input expression type is represented by the letter "T," which, for example, may represent an arbitrary type expression such as element(a, aT), element(b, bT), element(c, cT), etc.

Figure 5:
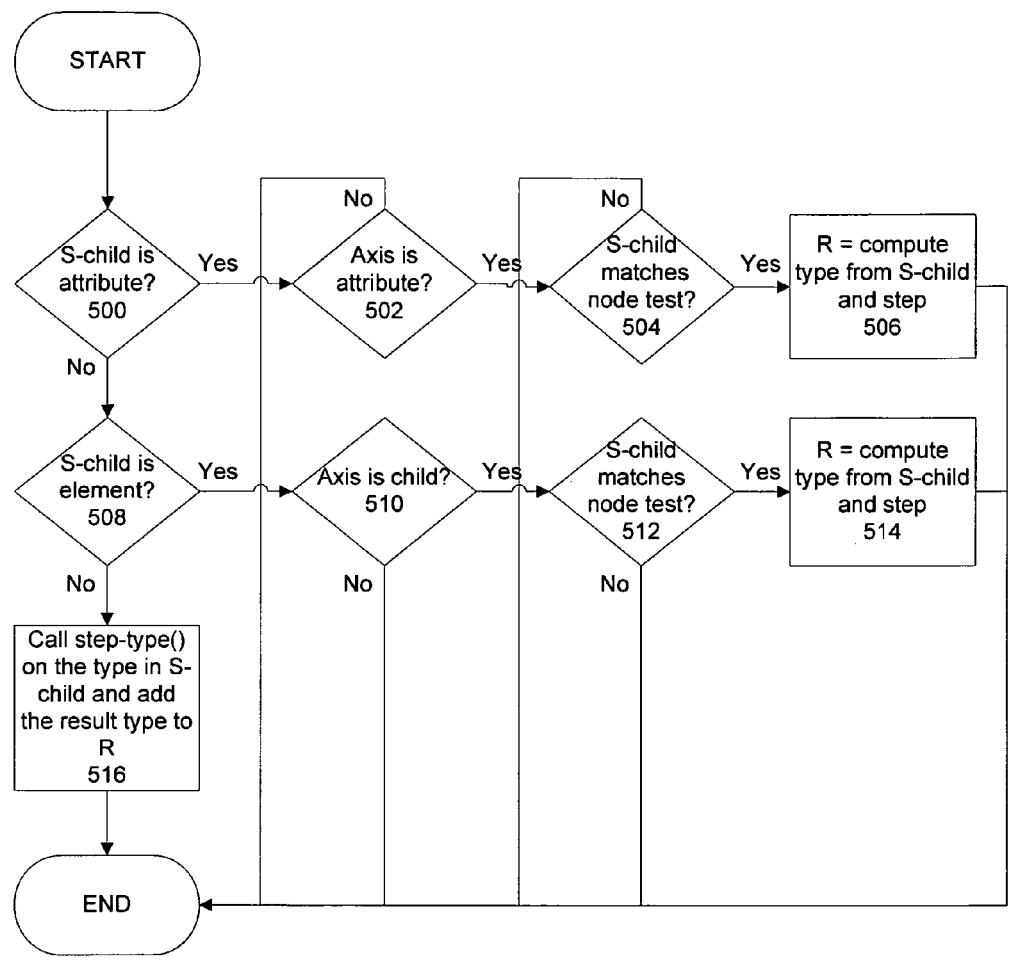
FIG. 5 is a flowchart of an exemplary method for computing a type for each symbol in an element content in accordance with the present invention.

FIG. 4e depicts an exemplary algorithm for defining a step-type-from-symbol (S, step) 404. In portions of algorithms 401-404 set forth above, the type is computed for a step and for each symbol in the element content (represented by the notation "S-child"). A flowchart depicting this portion of algorithms 401-404 is shown in FIG. 5. For simplicity, only the child and attribute axes are depicted in FIG. 5. However, this portion of the algorithm may be extended for the descendant axis as well. At act 500, it is determined whether S-child is an attribute. If so, then, at act 502, it is determined whether the axis is the attribute axis. If not, then algorithm is concluded for the current S-child. If so, then, at act 504, it is determined whether S-child matches the node test. If not, then algorithm is concluded for the current S-child. If so, then, at act 506, a resulting type ("R") is computed from S-child and the step.

If, at act 500, it is determined that S-child is not an attribute, then, at act 508, it is determined whether S-child is an element. If not, then, at stage 516, step-type() is called in S-child and the result is added to R. If so, then, at act 510, it is determined whether the axis is the child axis. If not, then algorithm is concluded for the current S-child. If so, then, at act 512, it is determined whether S-child matches the node test. If not, then algorithm is concluded for the current S-child. If so, then, at act 514, R is computed from S-child and the step.

The exemplary method depicted in FIG. 3 and the exemplary algorithms depicted in FIGS. 4a-e and FIG. 5 will now be illustrated in connection with an exemplary path expression shown below:

/Customer/*/Street

The above path expression will return the "Street" elements within any of the "Customer" sub-elements. The type inference will be calculated using the type information depicted in exemplary symbol table 200 of FIG. 2. The formal semantics type notation for this type information is shown below:

```
define element Customer as [Anon1]
define type [Anon1] as {element(Name, xs:string),
element(Address, AddressType)}
define type AddressType {element(Street, xs:string),
element(City, xs:string)}
```

To illustrate this example, consider the scenario where the above information is provided in a database using a schema associated with an XML datatype such as, for example, a datatype specified in the ISO SQL standard. For this schema, the XML datatype indicates that it can contain only a single top-level element node because it is defined as "XML (DOCUMENT S)" with "S" representing the schema collection that provides the type information.

First, the static type inference will be calculated using the W3C techniques and then using techniques in accordance with the present invention. A simplified version of the W3C normalization of the above expression is shown in FIG. 6. As shown, the expression is normalized into a series of three "for" expressions, which may be referred to as inner, outer, and middle for expressions. A reference to the document root ("fn:root()") has been added to the inner for line. Also, the item "$fs:dot" represents the context item on which a step in the path expression operates.

A simplified version of the W3C static type inference for the expression is shown in FIG. 7. As shown, the static type inference includes acts 701-714. Act 701 calculates the static type for the root node of the schema. Acts 702-705 calculate the static type for the inner "for" line of the normalization. Acts 706-710 calculate the static type for the middle "for" line of the normalization. Acts 711-714 calculate the static type for the outer "for" line of the normalization.

At acts 702, 706 and 710, the prime factorization of the previously calculated resulting type is performed. At acts 705, 709, and 713, the quantifier of the prime factorization from acts 702, 706 and 710, respectively, is added to the result set. For acts 705 and 709, the quantifier of prime factorization does not change the result set because the prime factorization is performed on only a single element in acts 702 and 706. However, in act 710, the prime factorization is performed on a sequence of two elements listed in act 709 "(element(Name, xs:string), element(Address, AddressType))". Thus, the prime factorization performed in act 710 changes the structural aspect of the elements listed in act 709 from a sequence to a union. As set forth above, when a sequence is changed to a union during the prime factorization, the cardinality changes from each element occurring at most once to each element occurring potentially multiple times. As also set forth above, the new cardinality of each element occurring one or more times is represented by the "+" quantifier. Thus, at act 713, a "+" quantifier is added to the end of the resulting type. Accordingly, the resulting W3C static type inference in act 713 indicates that the "Street" element may occur one or more times. This resulting type inference losses the precision of the schema, which reflects that the "Street" element occurs only once within the "Customer" element.

The exemplary expression will now be normalized using exemplary techniques in accordance with the present invention. First, the expression is normalized into an exemplary simplified form shown below:

---
fn:root( )/child::Customer/child::*/child::Street
---

Once again, a reference to the document root ("fn:root()") has been added to the normalization. An exemplary simplified version of the static type inference for the expression in accordance with the present invention is shown in FIG. 8. As shown, the static type inference includes acts 801-804. Act 801 calculates the static type for the input expression of the normalization, which is the root node. Act 802 calculates the static type for the second step of the normalization. For act 802, the input includes the type of the input expression ("document{element(Customer,[Anon1])}"), the axis of the second step ("child"), and the node test of the second step ("Customer"). The resulting type for the second step may then be calculated using exemplary algorithm 402 of FIGS. 4b-c for the child axis. The resulting type for the second step is ("element(Customer,[Anon1])").

Act 803 calculates the static type for the third step of the normalization. For act 803, the input includes the type of the second step ("element(Customer,[Anon1])"), which now serves as the type of the input expression for the thrid step. The input also includes the axis of the third step ("child"), and the node test of the third step ("*"). The resulting type for the third step may then be calculated using the exemplary algorithm of FIG. 4c for the child axis. The resulting type for the third step is ("element(Name,[xs:string]), element(Address, Address Type)").

The calculation performed at act 803 may be used to demonstrate the algorithm of FIG. 5. The second step type calculated at act 802 includes a single "Customer" element which has two sub-elements: "Name" and "Address". Accordingly, for the algorithm of FIG. 5, there will be a "Name" S-child and an "Address" S-child. For the "Name" S-child, it is determined at act 500 that the "Name" S-child is not an attribute. Then, at act 508, it is determined that the "Name" S-child is an element. At act 510, it is determined that the axis of the third step is the child axis. At act 512, it is determined that the "Name" S-child matches the third step's node test. This is because all children will match a node test of "*". At act 514, the first portion of the result set "R" ("element(Name,[xs:string]") is calculated from the "Name" S-child.

For the "Address" S-child, it is determined at act 500 that the "Address" S-child is not an attribute. Then, at act 508, it is determined that the "Address" S-child is an element. At act 510, it is determined that the axis of the third step is the child axis. At act 512, it is determined that the "Address" S-child matches the third node test. This is because all children will match a node test of "*". At act 514, the second portion of R ("element(Address, Address Type)") is calculated from the "Address" S-child.

Act 804 calculates the static type for the fourth step of the normalization. For act 804, the input includes the type of the third step ("element(Name,[xs:string]), element(Address, Address Type)"), the axis of the fourth step ("child"), and the node test of the fourth step ("Street"). The resulting type for the fourth step may then be calculated using the exemplary algorithm of FIG. 4b for the child axis. The resulting type for the fourth step is ("element(Street,[xs:string])").

The calculation performed at act 804 may also be used to demonstrate the algorithm of FIG. 5. The third step type calculated at act 803 includes two elements: "Name" and "Address". The "Name" element is a simple type with no sub-elements. Accordingly, there is no S-child for the "Name" element. The "Address" type is a complex type with two sub-elements: "Street" and "City". Accordingly, there will be a "Street" S-child and an "City" S-child. For the "City" S-child, it is determined at act 500 that the "City" S-child is not an attribute. Then, at act 508, it is determined that the "City" S-child is an element. At act 510, it is determined that the axis of the fourth step is the child axis. At act 512, it is determined that the "City" S-child does not match the fourth step's node test. Accordingly, the result set R is empty for the "City" S-child.

For the "Street" S-child, it is determined at act 500 that the "Street" S-child is not an attribute. Then, at act 508, it is determined that the "Street" S-child is an element. At act 510, it is determined that the axis of the fourth step is the child axis. At act 512, it is determined that the "Street" S-child matches the fourth step's node test. At act 514, the result set R ("element(Street,[xs:string]")") is calculated from the "Street" S-child.

The resulting type calculated at act 804 includes only a single "Street" element with a cardinality of exactly one. This is different from the resulting type calculated using the W3C techniques at act 713 of FIG. 7, which includes a cardinality of one or more ("+"). This is because, while the W3C techniques perform the prime type and occurrence simplification (acts 702, 706 and 710), the technique in accordance with the present invention does not perform the prime factorization on any of the intermediate acts 801-803. Rather the cardinality of each intermediate step type 801-803 is preserved in accordance with act 310 of FIG. 3. For example, the resulting type of act 803 includes a sequence of exactly two elements, which are preserved and used to calculate the resulting type in act 804.

Accordingly, as set forth above with reference to the exemplary systems and methods of FIGS. 1-8, the present invention provides systems and methods for an improved type inference. As is apparent from the above, all or portions of the various systems, methods, and aspects of the present invention may be embodied in hardware, software, or a combination of both. When embodied in software, the methods and apparatus of the present invention, or certain aspects or portions thereof, may be embodied in the form of program code (i.e., instructions). This program code may be stored on a computer-readable medium, such as a magnetic, electrical, or optical storage medium, including without limitation a floppy diskette, CD-ROM, CD-RW, DVD-ROM, DVD-RAM, magnetic tape, flash memory, hard disk drive, or any other machine-readable storage medium, wherein, when the program code is loaded into and executed by a machine, such as a computer or server, the machine becomes an apparatus for practicing the invention. A computer on which the program code executes will generally include a processor, a storage medium readable by the processor (including volatile and non-volatile memory and/or storage elements), at least one input device, and at least one output device. The program code may be implemented in a high level procedural or object oriented programming language. Alternatively, the program code can be implemented in an assembly or machine language. In any case, the language may be a compiled or interpreted language.

The present invention may also be embodied in the form of program code that is transmitted over some transmission medium, such as over electrical wiring or cabling, through fiber optics, over a network, including a local area network, a wide area network, the Internet or an intranet, or via any other form of transmission, wherein, when the program code is received and loaded into and executed by a machine, such as a computer, the machine becomes an apparatus for practicing the invention.

When implemented on a general-purpose processor, the program code may combine with the processor to provide a unique apparatus that operates analogously to specific logic circuits.

Moreover, the invention can be implemented in connection with any computer or other client or server device, which can be deployed as part of a computer network, or in a distributed computing environment. In this regard, the present invention pertains to any computer system or environment having any number of memory or storage units, and any number of applications and processes occurring across any number of storage units or volumes, which may be used in connection with the present invention. The present invention may apply to an environment with server computers and client computers deployed in a network environment or distributed computing environment, having remote or local storage. The present invention may also be applied to standalone computing devices, having programming language functionality, interpretation and execution capabilities for generating, receiving and transmitting information in connection with remote or local services.

Distributed computing facilitates sharing of computer resources and services by exchange between computing devices and systems. These resources and services include, but are not limited to, the exchange of information, cache storage, and disk storage for files. Distributed computing takes advantage of network connectivity, allowing clients to leverage their collective power to benefit the entire enterprise. In this regard, a variety of devices may have applications, objects or resources that may implicate processing performed in connection with the present invention.

Figure 9:
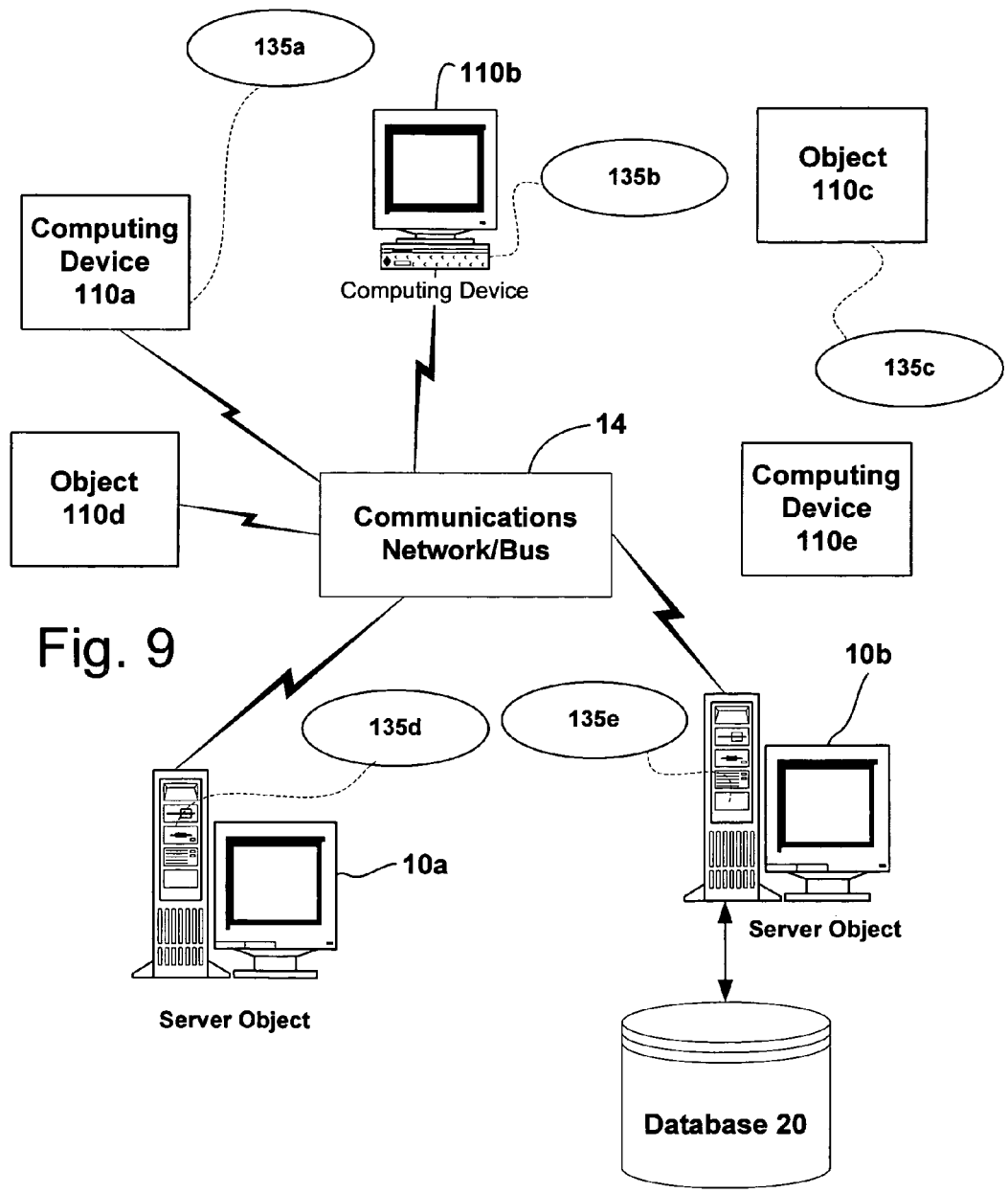
FIG. 9 is a block diagram representing an exemplary network environment having a variety of computing devices in which the present invention may be implemented.

FIG. 9 provides a schematic diagram of an exemplary networked or distributed computing environment. The distributed computing environment comprises computing objects 10*a*, 10*b*, etc. and computing objects or devices 110*a*, 110*b*, 110*c*, etc. These objects may comprise programs, methods, data stores, programmable logic, etc. The objects may comprise portions of the same or different devices such as PDAs, televisions, MP3 players, personal computers, etc. Each object can communicate with another object by way of the communications network 14. This network may itself comprise other computing objects and computing devices, and may itself represent multiple interconnected networks. In accordance with an aspect of the invention, each object 10*a*, 10*b*, etc. or 110*a*, 110*b*, 110*c*, etc. may contain an application that might make use of an API, or other object, software, firmware and/or hardware, to request use of the processes used to implement the present invention.

It can also be appreciated that an object, such as 110*c*, may be hosted on another computing device 10*a*, 10*b*, etc. or 110*a*,110*b*, etc. Thus, although the physical environment depicted may show the connected devices as computers, such illustration is merely exemplary and the physical environment may alternatively be depicted or described comprising various digital devices such as PDAs, televisions, MP3 players, etc., software objects such as interfaces, COM objects and the like.

There are a variety of systems, components, and network configurations that support distributed computing environments. For example, computing systems may be connected together by wired or wireless systems, by local networks or widely distributed networks. Currently, many of the networks are coupled to the Internet, which provides the infrastructure for widely distributed computing and encompasses many different networks. Any of the infrastructures may be used for exemplary communications made incident to the present invention.

The Internet commonly refers to the collection of networks and gateways that utilize the TCP/IP suite of protocols, which are well-known in the art of computer networking. TCP/IP is an acronym for "Transmission Control Protocol/Internet Protocol." The Internet can be described as a system of geographically distributed remote computer networks interconnected by computers executing networking protocols that allow users to interact and share information over the network(s). Because of such wide-spread information sharing, remote networks such as the Internet have thus far generally evolved into an open system for which developers can design software applications for performing specialized operations or services, essentially without restriction.

Thus, the network infrastructure enables a host of network topologies such as client/server, peer-to-peer, or hybrid architectures. The "client" is a member of a class or group that uses the services of another class or group to which it is not related. Thus, in computing, a client is a process, i.e., roughly a set of instructions or tasks, that requests a service provided by another program. The client process utilizes the requested service without having to "know" any working details about the other program or the service itself. In a client/server architecture, particularly a networked system, a client is usually a computer that accesses shared network resources provided by another computer, e.g., a server. In the example of FIG. 9, computers 110a, 110b, etc. can be thought of as clients and computer 10a, 10b, etc. can be thought of as servers, although any computer could be considered a client, a server, or both, depending on the circumstances. Any of these computing devices may be processing data in a manner that implicates the invention.

A server is typically a remote computer system accessible over a remote or local network, such as the Internet. The client process may be active in a first computer system, and the server process may be active in a second computer system, communicating with one another over a communications medium, thus providing distributed functionality and allowing multiple clients to take advantage of the information-gathering capabilities of the sever. Any software objects utilized pursuant to the invention may be distributed across multiple computing devices.

Client(s) and server(s) may communicate with one another utilizing the functionality provided by a protocol layer. For example, Hypertext Transfer Protocol (HTTP) is a common protocol that is used in conjunction with the World Wide Web (WWW), or "the Web." Typically, a computer network address such as an Internet Protocol (IP) address or other reference such as a Universal Resource Locator (URL) can be used to identify the server or client computers to each other. The network address can be referred to as a URL address. Communication can be provided over any available communications medium.

Thus, FIG. 9 illustrates an exemplary networked or distributed environment, with a sewer in communication with client computers via a network/bus, in which the present invention may be employed. The network/bus 14 may be a LAN, WAN, intranet, the Internet, or some other network medium, with a number of client or remote computing devices 110a, 110b, 110c, 110d, 110e, etc., such as a portable computer, handheld computer, thin client, networked appliance, or other device, such as a VCR, TV, oven, light, heater and the like in accordance with the present invention.

In a network environment in which the communications network/bus 14 is the Internet, for example, the servers 10a, 10b, etc. can be servers with which the clients 110a, 110b, 110c, 110d,110e, etc. communicate via any of a number of known protocols such as HTTP. Servers 10a, 10b, etc. may also serve as clients 110a, 110b, 110c, 110d, 110e, etc., as may be characteristic of a distributed computing environment.

Communications may be wired or wireless, where appropriate. Client devices 110a, 110b, 110c, 110d, 110e, etc. may or may not communicate via communications network/bus 14, and may have independent communications associated therewith. For example, in the case of a TV or VCR, there may or may not be a networked aspect to the control thereof. Each client computer 110a, 110b, 110c, 110d, 110e, etc. and server computer 10a, 10b, etc. may be equipped with various application program modules or objects 135 and with connections or access to various types of storage elements or objects, across which files or data streams may be stored or to which portion(s) of files or data streams may be downloaded, transmitted or migrated. Any computer 10a, 10b, 110a, 110b, etc. may be responsible for the maintenance and updating of a database, memory, or other storage element 20 for storing data processed according to the invention. Thus, the present invention can be utilized in a computer network environment having client computers 110a, 110b, etc. that can access and interact with a computer network/bus 14 and server computers 10a, 10b, etc. that may interact with client computers 110a, 110b, etc. and other like devices, and databases 20.

FIG. 9 and the following discussion are intended to provide a brief general description of a suitable computing device in connection with which the invention may be implemented. For example, any of the client and server computers or devices illustrated in FIG. 9 may take this form. It should be understood, however, that handheld, portable and other computing devices and computing objects of all kinds are contemplated for use in connection with the present invention, i.e., anywhere from which data may be generated, processed, received and/or transmitted in a computing environment. While a general purpose computer is described below, this is but one example, and the present invention may be implemented with a thin client having network/bus interoperability and interaction. Thus, the present invention may be implemented in an environment of networked hosted services in which very little or minimal client resources are implicated, e.g., a networked environment in which the client device serves merely as an interface to the network/bus, such as an object placed in an appliance. In essence, anywhere that data may be stored or from which data may be retrieved or transmitted to another computer is a desirable, or suitable, environment for operation of the object persistence methods of the invention.

Although not required, the invention can be implemented via an operating system, for use by a developer of services for a device or object, and/or included within application or server software that operates in accordance with the invention. Software may be described in the general context of computer-executable instructions, such as program modules, being executed by one or more computers, such as client workstations, servers or other devices. Generally, program modules include routines, programs, objects, components, data structures and the like that perform particular tasks or implement particular abstract data types. Typically, the functionality of the program modules may be combined or distributed as desired in various embodiments. Moreover, the invention may be practiced with other computer system configurations and protocols. Other well known computing systems, environments, and/or configurations that may be suitable for use with the invention include, but are not limited to, personal computers (PCs), automated teller machines, server computers, hand-held or laptop devices, multi-processor systems, microprocessor-based systems, programmable consumer electronics, network PCs, appliances, lights, environmental control elements, minicomputers, mainframe computers and the like.

Figure 10:
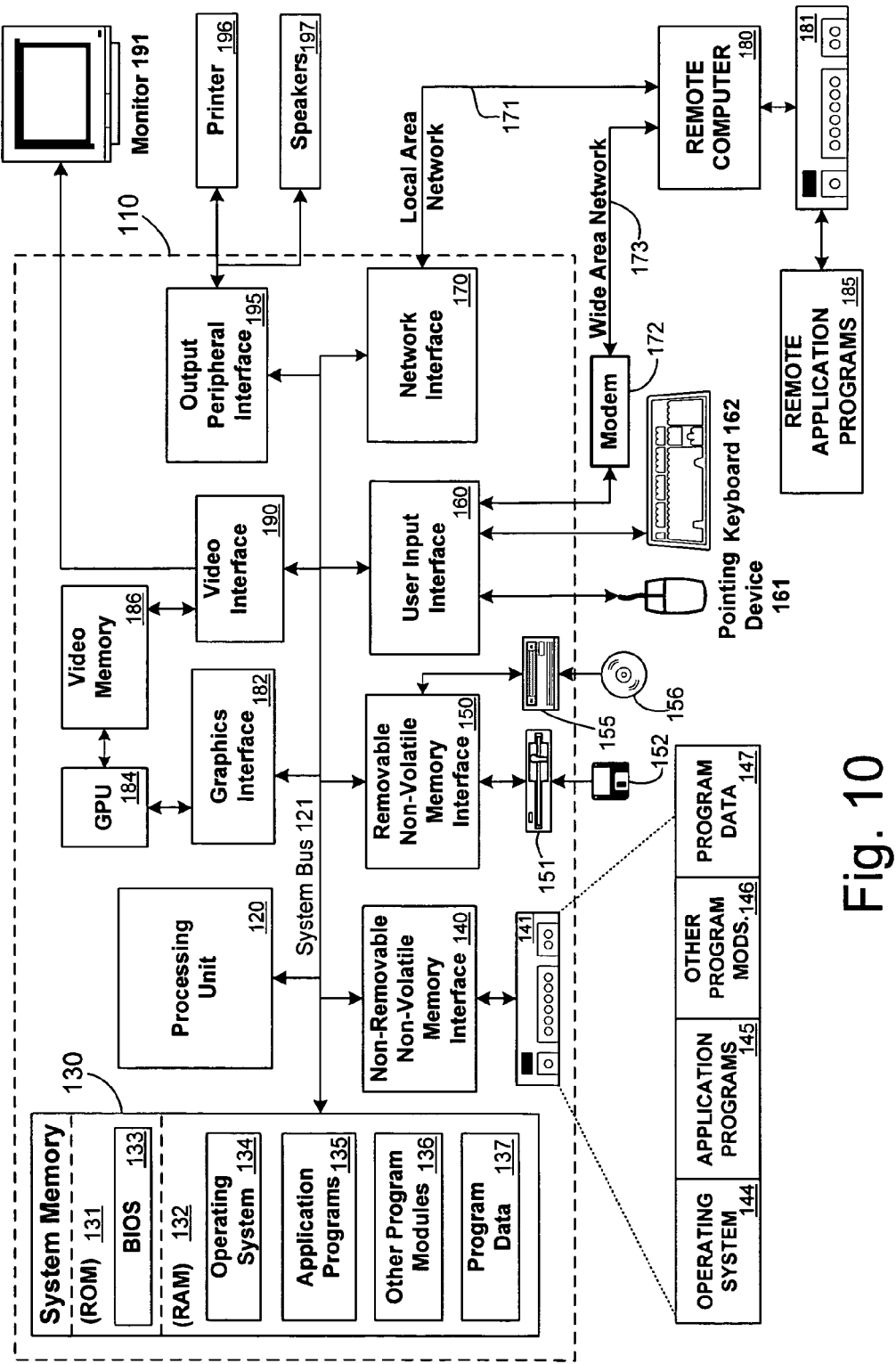
FIG. 10 is a block diagram representing an exemplary computing device in which the present invention may be implemented.

FIG. 10 thus illustrates an example of a suitable computing system environment 1000 in which the invention may be implemented, although as made clear above, the computing system environment 1000 is only one example of a suitable computing environment and is not intended to suggest any limitation as to the scope of use or functionality of the invention. Neither should the computing environment 1000 be interpreted as having any dependency or requirement relating to any one or combination of components illustrated in the exemplary operating environment 1000.

With reference to FIG. 10, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media include both volatile and nonvolatile, removable and non-removable media implemented in any method or technology for storage of information such as computer readable instructions, data structures, program modules or other data. Computer storage media include, but are not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embody computer readable instructions, data structures, program modules or other data in a modulated data signal such as a carrier wave or other transport mechanism and include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 10 illustrates operating system 134, application programs 135, other program modules 136, and program data 137.

The computer 110 may also include other removable/non-removable, volatile/nonvolatile computer storage media. By way of example only, FIG. 10 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD-RW, DVD-RW or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 10 provide storage of computer readable instructions, data structures, program modules and other data for the computer 110. In FIG. 10, for example, hard disk drive 141 is illustrated as storing operating system 144, application programs 145, other program modules 146 and program data 147. Note that these components can either be the same as or different from operating system 134, application programs 135, other program modules 136 and program data 137. Operating system 144, application programs 145, other program modules 146 and program data 147 are given different numbers here to illustrate that, at a minimum, they are different copies. A user may enter commands and information into the computer 110 through input devices such as a keyboard 162 and pointing device 161, such as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A graphics interface 182 may also be connected to the system bus 121. One or more graphics processing units (GPUs) 184 may communicate with graphics interface 182. A monitor 191 or other type of display device is also connected to the system bus 121 via an interface, such as a video interface 190, which may in turn communicate with video memory 186. In addition to monitor 191, computers may also include other peripheral output devices such as speakers 197 and printer 196, which may be connected through an output peripheral interface 195.

The computer 110 may operate in a networked or distributed environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 10. The logical connections depicted in FIG. 10 include a local area network (LAN) 171 and a wide area network (WAN) 173, but may also include other networks/buses. Such networking environments are commonplace in homes, offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 10 illustrates remote application programs 185 as residing on memory device 181. It will be appreciated that the network connections shown are exemplary and other means of establishing a communications link between the computers may be used.

CONCLUSION

Thus, systems and methods for an improved type inference have been disclosed. While the present invention has been described in connection with the preferred embodiments of the various figures, it is to be understood that other similar embodiments may be used or modifications and additions may be made to the described embodiment for performing the same function of the present invention without deviating therefrom. Therefore, the present invention should not be limited to any single embodiment, but rather should be construed in breadth and scope in accordance with the appended claims.

What is claimed:

1. A method for efficient execution of a query to generate a set of query results, the method comprising:
    storing data in a data storage element;
    receiving a query that requests a portion of the data that is stored in the data storage element;
    identifying a path expression in accordance with the query, the path expression having an input expression followed by the step, the input expression having an associated input expression type with an associated input expression type cardinality, the step having an axis and a node test;
    preserving the input expression type cardinality for calculating the inferred type of the step;
    calculating the inferred type of the step in accordance with the preserved input expression type cardinality, the axis, and the node test;
    generating a LogOp tree in accordance with the calculated inferred type; and
    executing the query by:
        retrieving in accordance with the LogOp tree the portion of the data from the data storage element that is requested by the query; and
        generating the set of query results including the retrieved portion of the data.

2. The method of claim 1, comprising calculating the inferred type of the step in accordance with the preserved input expression type cardinality, the axis, and the node test which is a node kind test.

3. The method of claim 1, comprising calculating the inferred type of the step in accordance with the preserved input expression type cardinality, the axis, and the node test which is a name test.

4. The method of claim 1, wherein calculating the inferred type of the step in accordance with the preserved input expression type cardinality, the axis, and the node test comprises:
    identifying a set of at least one matching node type within a type repository that matches both the axis and the node test for the step without calculating a full content type implied by the axis;
    retrieving a type of each identified matching node from the type repository; and
    calculating the inferred type of the step in accordance with the preserved input expression type cardinality and the type of each identified matching node.

5. The method of claim 1, wherein calculating the inferred type of the step comprises:
    identifying a symbol in element content corresponding to the input expression;
    determining that the symbol is an element;
    determining whether the axis is a child axis;
        if not, then returning an empty set;
        if so, then determining whether the symbol matches the node test;
            if not, then returning an empty set;
            if so, then calculating the inferred type of the step in accordance with the symbol.

6. The method of claim 1, wherein calculating the inferred type of the step comprises:
    identifying a symbol in element content corresponding to the input expression;
    determining that the symbol is an attribute;
    determining whether the axis is an attribute axis;
        if not, then returning an empty set;
        if so, then determining whether the symbol matches the node test;
            if not, then returning an empty set;
            if so, then calculating the inferred type of the step in accordance with the symbol.

7. A computer readable medium having computer executable instructions for performing the steps recited in claim 1.

8. A method for efficient execution of a query to generate a set of query results, the method comprising:
    storing data in a data storage element;
    receiving a query that requests a portion of the data that is stored in the data storage element;
    identifying a path expression in accordance with the query, the path expression having an input expression followed by the step, the input expression having an associated input expression type with an associated input expression type cardinality, the step having an axis and a node test;
    identifying a set of at least one matching node type within a type repository that matches both the axis and the node test for the step without calculating a full content type implied by the axis;
    retrieving a type of each identified matching node from the type repository
    generating a LogOp tree in accordance with the retrieved type of each identified matching node; and
    executing the query by:
        retrieving in accordance with the LogOp tree the portion of the data from the data storage element that is requested by the query; and
        generating the set of query results including the retrieved portion of the data.

9. The method of claim 8, comprising identifying a set of at least one matching node type within a type repository that matches both the axis and the node test which is a node kind test.

10. The method of claim 8, comprising identifying a set of at least one matching node type within a type repository that matches both the axis and the node test which is a name test.

11. The method of claim 8, further comprising:
    preserving the input expression type cardinality for calculating the inferred type of the step; and
    calculating the inferred type of the step in accordance with the preserved input expression type cardinality and the type of each identified matching node.

12. The method of claim 11, wherein calculating the inferred type of the step comprises:
    identifying a symbol in element content corresponding to the input expression;
    determining that the symbol is an element;

determining whether the axis is a child axis;
  if not, then returning an empty set;
  if so, then determining whether the symbol matches the node test;
    if not, then returning an empty set;
    if so, then calculating the inferred type of the step in accordance with the symbol.

13. The method of claim 11, wherein calculating the inferred type of the step comprises:
  identifying a symbol in element content corresponding to the input expression;
  determining that the symbol is an attribute;
  determining whether the axis is an attribute axis;
    if not, then returning an empty set;
    if so, then determining whether the symbol matches the node test;
      if not, then returning an empty set;
      if so, then calculating the inferred type of the step in accordance with the symbol.

14. A computer readable medium having computer executable instructions for performing the steps recited in claim 8.

15. A system for efficient execution of a query to generate a set of query results, the system comprising:
  a processor operative to execute computer executable instructions; and
  memory having stored therein computer executable instructions for performing the following stages:
    storing data in a data storage element;
    receiving a query that requests a portion of the data that is stored in the data storage element;
    identifying a path expression in accordance with the query, the path expression having an input expression followed by the step, the input expression having an associated input expression type with an associated input expression type cardinality, the step having an axis and a node test;
    preserving the input expression type cardinality for calculating the inferred type of the step;
    calculating the inferred type of the step in accordance with the preserved input expression type cardinality, the axis, and the node test;
    generating a LogOp tree in accordance with the calculated inferred type; and
    executing the query by:
      retrieving in accordance with the LogOp tree the portion of the data from the data storage element that is requested by the query; and
      generating the set of query results including the retrieved portion of the data.

16. The system of claim 15, wherein the node test is a node kind test.

17. The system of claim 15, wherein the node test is a name test.

18. The system of claim 15, further comprising a type repository into which type information corresponding to a schema is loaded.

19. The system of claim 15, wherein the type repository is a symbol table.

20. The system of claim 15, further comprising an annotated abstract syntax tree in which the inferred type of the step annotates a corresponding step node.

* * * * *

UNITED STATES PATENT AND TRADEMARK OFFICE
CERTIFICATE OF CORRECTION

PATENT NO.         : 7,426,503 B2                                         Page 1 of 1
APPLICATION NO.    : 11/113708
DATED              : September 16, 2008
INVENTOR(S)        : Adrian S. Baras et al.

It is certified that error appears in the above-identified patent and that said Letters Patent is hereby corrected as shown below:

In column 11, line 26, delete "sever." and insert -- server. --, therefor.

In column 11, line 41, delete "sewer" and insert -- server --, therefor.

Signed and Sealed this
Twenty-sixth Day of April, 2011

David J. Kappos
*Director of the United States Patent and Trademark Office*